United States Patent
Shao et al.

(10) Patent No.: US 7,330,433 B2
(45) Date of Patent: Feb. 12, 2008

(54) DYNAMIC RESOURCE CONTROL FOR HIGH-SPEED DOWNLINK PACKET ACCESS WIRELESS CHANNELS

(75) Inventors: Huai-Rong Shao, Cambridge, MA (US); Chia Shen, Lexington, MA (US); Jinyun Zhang, New Providence, NJ (US); Daqing Gu, Morris Plains, NJ (US); Philip Orlik, Scotch Plains, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 987 days.

(21) Appl. No.: 10/376,536

(22) Filed: Feb. 28, 2003

(65) Prior Publication Data
US 2004/0170186 A1  Sep. 2, 2004

(51) Int. Cl.
G06F 11/00 (2006.01)
H04J 3/14 (2006.01)
H04L 1/00 (2006.01)
H04L 12/28 (2006.01)
H04L 12/56 (2006.01)
H04Q 7/00 (2006.01)

(52) U.S. Cl. .................. 370/235; 370/328; 370/412
(58) Field of Classification Search ........ 370/229–230, 370/235, 412, 328
See application file for complete search history.

(56) References Cited

U.S. PATENT DOCUMENTS 6,389,031 B1  5/2002  Chao et al. .................. 370/412

2002/0080719 A1*  6/2002  Parkvall et al. .............. 370/235
2003/0050954 A1*  3/2003  Tayyar et al. ................ 709/102
2005/0128951 A1*  6/2005  Chawla et al. ............... 370/235

FOREIGN PATENT DOCUMENTS

EP  1213868  12/2002

OTHER PUBLICATIONS

P. Bender, et al. "CDMA/HDR: A bandwidth efficient high speed data service for nomadic users", IEEE Commun. Mag., vol. 38, No. 7, pp. 70-77, Jul. 2000.
Motorola, "Feasibility study of advanced technique for High Speed Downlink Packet Access," TSG-R WG1 document, R1-556, Apr. 2000, Seoul, Korea.
Y. Cao, V. Li, "Scheduling Algorithms in Broad-Band Wireless Networks", IEEE Proceedings of the IEEE, p. 76-87, vol. 89, No. 1, Jan. 2001.

(Continued)

Primary Examiner—Kevin C. Harper
(74) Attorney, Agent, or Firm—Dirk Brinkman; Clifton D. Mueller; Gene V. Vinokur

(57) ABSTRACT

A method allocates resources of a wireless communications network to traffic transmitted to user equipment over a channel of the network. A packet of the traffic to be stored in a selected queue is received. A maximum delay of the selected queue is determined, along with a start time, a finish time, and a queuing order. The packet is inserted in the selected queue according to the start time, the finish time and the queuing order, and then a weight of the selected queue is updated. Then, a next packet to be dequeued from the selected queue is scheduled, and the next packet is transmitted to the user equipment over the channel.

5 Claims, 2 Drawing Sheets

OTHER PUBLICATIONS

C. Fragouli, V. Sivaraman, and M. Srivastava, "Controlled multimedia wireless link sharing via enhanced class-based queuing with channel-state dependent packet scheduling," in *Proc. INFOCOM'98*, vol. 2, Mar. 1998, pp. 572-580.

S. Lu and V. Bharghavan, "Fair scheduling in wireless packet networks," *IEEE/ACM Trans. Networking*, vol. 7, No. 4, pp. 473-489, 1999.

T. S. Eugene Ng, I. Stoica, and H. Zhang, "Packet fair queueing algorithms for wireless networks with location-dependent errors," in *Proc. INFOCOM98*, Mar. 1998, pp. 1103-1111.

P. Ramanathan and P. Agrawal, "Adapting packet fair queueing algorithms to wireless networks," in *Proc. ACM MOBICOM'98*, Oct. 1998.

J. Gomez, A. T. Campbell, and H. Morikawa, "The Havana framework for supporting application and channel dependent QoS in wireless networks," in *Proc. ICNP'99*, Nov. 1999, pp. 235-244.

Li Wang, Yu-Kwong Kwok, Wing-Cheong Lau, and Vincent K. N. Lau, "Channel Capacity Fair Queueing in Wireless Networks: Issues and A New Algorithm", ICC 2002, Apr. 2002, New York, U.S.A.

M. Andrews, K. Kumaran, K. Ramanan, A. Stolyar, P. Whiting, and R. Vijayakumar, "Providing quality of service over a shared wireless link," *IEEE Communications Magazine*, vol. 39, No. 2, pp. 150-154, Feb. 2001.

L. Xu, X. Shen, J. Mark, "Dynamic bandwidth allocation with fair scheduling for WCDMA systems", IEEE Wireless Communications, Apr. 2002.

Hui Zhang, "Service Discipline For Guarenteed Performance Service in Packet-Switching Networks", Proceedings of IEEE, 83(10), Oct. 1995.

W. Jeon, D. Jeong, B. Kim, "Design of Packet Transmission Scheduler for High Speed Downlink Packet Access Systems", Proc. Of the IEEE VTC 2002, Spring.

Chen Shan, "A new scalable and efficient packet scheduling method in high-speed packet switch networks," 2001 IEEE Workshop in High Performance Switching and Routing, May 29, 2001, pp. 16-20.

Arnab Das, Farooq Khan, Ashwin Sapath, Hsuan-Jung Su, "Adaptive, Asynchronous, Incremental Redundancy (A2IR) with Fixed Transmission Time Intervals for HSDPA," 13th IEEE Int'l Symposium on Personal Indoor and Mobile Radio Communications, Sep. 5, 2002, pp. 1-5.

Haifeng Wang, Ville Haikola, Jorma Lillberg, "Adv hi speed packet access receiver for WCDMA multicode transmission with hi-order modulation," 13th IEEE Int'l Symposium on Personal Indoor and Mobile Radio Communications, Sep. 15, 2002, pp. 1-5.

\* cited by examiner

DYNAMIC RESOURCE CONTROL FOR HIGH-SPEED DOWNLINK PACKET ACCESS WIRELESS CHANNELS

FIELD OF THE INVENTION

This invention relates generally to wireless packet networks, and more particularly to resource control on downlink channels of wireless networks.

BACKGROUND OF THE INVENTION

Wireless communications networks, such as cellular networks, need to support integrated multimedia applications with various quality of service (QoS) requirements. By differentiating the QoS for different high-speed services, it becomes possible to support multimedia demands for a variety of user equipment (UE) in a cell served by a base station. The UE can include cellular telephones, mobile computing devices, and other end-user terminals.

Due to differences between traffic characteristics of data packet services and traditional circuit-switched voice services, dedicated channels are allocated for data services in many systems and many standard specifications are known, such as the High Data Rate (HDR) systems, see Bender, et al. "CDMA/HDR: A bandwidth efficient high speed data service for nonadic users," IEEE Commun. Mag., Vol. 38, No. 7, pp. 70-77, July, 2000, the 1xTREME of 3rd Generation Partnership Project 2 (3GPP2), Motorola and Nokia, "3GPP2 1xTREME Presentation," C00-20000327-003, March, 2000, and the High Speed Downlink Packet Access (HSDPA) of 3rd Generation Partnership Project (3GPP), Motorola, "Feasibility study of advanced technique for High Speed Downlink PacketAccess," TSG-R WG1 document, R1-556, April, 2000.

In a wireless packet network, the high-speed downlink data channel is shared by multiple UE within the same cell. Many new technologies have been developed for the shared downlink channel by standardization organizations. For example, in HSDPA of 3GPP, solutions include adaptive modulation and coding (AMC), hybrid automatic repeat request (H-ARQ), fast cell selection (FCS), and multiple-input-multiple-output (MIMO) systems.

AMC provides a link adaptation method that match the modulation-coding scheme to conditions of the channel for each user. In a system with AMC, UE close to the base station is typically assigned higher order modulation with higher code rates, e.g., 64 QAM with R=¾ turbo codes. The modulation-order and/or the code rate decrease as the distance between the UE and the base station increases.

H-ARQ provides a retransmission mechanism for lost or erroneous packets. There are many schemes for implementing H-ARQ, such as chase combining, rate compatible punctured turbo codes, and incremental redundancy.

With FCS, the UE selects the 'best' cell that should be used for the downlink channel through uplink signaling. Thus, while multiple cells can be members of an active set, only one cell transmits at any one time, potentially decreasing interference and increasing system capacity.

Multiple-input-multiple-output (MIMO) systems employ multiple antennas at both the transmitter of the base station and the receiver of the UE. This provides several advantages over conventional single antenna systems and transmit diversity techniques that only have multiple antennas at the transmitter.

An important issue is how to integrate resource control and management with these new technologies. For example, the data transmission capacity at a base station will vary according to the dynamic changing of AMC schemes. Given the same amount of code and time space, and resources, UE with a higher modulation scheme can usually obtain a higher data rate than UE with a lower modulation scheme.

Of particular concern to the present invention is resource allocation with QoS control for high-speed downlink shared channel adapted for AMC and H-ARQ systems.

Packet scheduling is one of the most important QoS control approaches for wireless multimedia networks. A large number of packet scheduling techniques are known for wireless networks, for example, channel state dependent packet scheduling (CSDPS), Fragouli et al., "Controlled multimedia wireless link sharing via enhanced class-based queuing with channel-state dependent packet scheduling," Proc. IN-FOCOM'98, vol. 2, pp. 572-580, March 1998, idealized wireless fair queuing process (IWFQ), see Lu et al., "Fair scheduling in wireless packet net-works," IEEE/ACM Trans. Networking, Vol. 7, No. 4, pp. 473-489, 1999, channel-condition independent fair queuing (CIF-Q), Ng et al., "Packet fair queuing algorithms for wireless networks with location-dependent errors," Proc. INFOCOM98, pp. 1103-1111, March 1998, server based fairness (SBFA), Ramanathan et al., "Adapting packet fair queuing algorithms to wireless networks," Proc. ACM MOBICOM'98, October 1998, improved channel state dependent packet scheduling (I-CSDPS), Gomez et al., "The Havana frame-work for supporting application and channel dependent QoS in wireless networks," Proc. ICNP'99, pp. 235-244, November 1999, channel adaptive fair queuing (CAFQ), Wang et al., "Channel Capacity Fair Queuing in Wireless Networks: Issues and A New Algorithm," ICC 2002, April 2002, modified largest weighted delay first (M-LWDF), Andrews et al., "Providing quality of service over a shared wireless link," IEEE Communications Magazine, Vol. 39, No. 2, pp. 150-154, February 2001, and code-division generalized processor sharing (CDGPS), Xu et al., "Dynamic bandwidth allocation with fair scheduling for WCDMA systems," IEEE Wireless Communications, April 2002.

Except for Wang, Andrews, and Xu, most prior art approaches assume a simple wireless model, such as two-state Markov model. A scheduler simulates an error-free system running a wireline packet scheduling process when sessions have 'good' channel states, i.e., the effective throughput is at a maximum. When the session that is scheduled to transmit data encounters a 'bad' channel state, the session gives up a transmit opportunity to other error-free sessions, e.g., those with good channel states. Then, these error-free sessions give their transmit rights back to the error session in compensation, when the channel state is good again. Those processes mainly provide fairness and a 'soft' QoS guarantees.

Wang describes a new definition of fairness, and a scheduling process adapting to several channel conditions. However, explicit QoS guarantees are not provided. Andrews describes a user scheduling process based on a tradeoff between delay and throughput. That approach assumes that each UE can only support one QoS traffic class at a time. Xu applies generalized processor sharing (GPS) scheme dynamically to spreading codes rather than to time slots for different UE.

It is desired to provide a method and system for dynamically controlling resources in a high-speed down link channel. The method and system should be closely integrated with other HSDPA technologies, such as AMC and H-ARQ. Because the AMC changes dynamically according to the channel conditions, the scheduler mechanism should not be based on the simple prior art 'on/off' wireless channel model.

In addition, H-ARQ introduces extra traffic load into wireless networks. Prior art scheduling techniques do not consider the increased load.

Furthermore, it is important to distinguish between original packets and retransmitted packets, and UE should be able to receive multiple streams with different QoS requirements simultaneously.

For instance, a user should be able to view a streaming video from a video server, while downloading a text file from a FTP server. Thus, the scheduler at the base station needs to handle both QoS traffic classes and different UEs sharing the capacity of the same downlink HSDPA channel.

Usually, prior art solutions only schedule resources to different UE terminals on an individual basis, without considering the resource and QoS requirements of different traffic classes.

Therefore, there is a need for a dynamic resource control system and method that considers all network traffic so that the throughput of the entire network is optimized.

SUMMARY OF THE INVENTION

The present invention provides a dynamic resource control method that is integrated with known HSDPA technologies, such as AMC and H-ARQ. Because the AMC scheme for each user is changed dynamically according to the channel conditions, the scheduler according to the invention dynamically obtains channel condition information of each user's equipment. Thus, the scheduler does need to use the simple 'on/off' control of the prior art wireless channel model.

The invention takes into consideration the increased load introduced into the wireless network by H-ARQ. The invention differentiates original packets and retransmitted packets by placing them in different queues so that UE can receive multiple streams with different QoS requirements simultaneously.

The invention assigns UE with different QoS requirements to different traffic classes at the base station, rather than to different UE as in the prior art.

Queue parameters, such as queue length and weights, are specified according to delay and packet loss requirements. The invention uses a delay-sensitive VVFQ (DSWFQ) scheduling scheme that dynamically adjusts the queue weights according to the dynamic load of the traffic and queue status.

Therefore, the invention can provide explicit QoS for each class of users. Users are classified according to their current AMC schemes, and classes can be sub-divided into sub-classes. Users with a 'good' channel condition, as obtained from the AMC schemes, are given higher scheduling priority than those with a 'bad' channel condition.

This is accomplished by setting different random early detection (RED) for different AMC schemes. Because of the classification of users according to the invention, the throughput of the entire network can be optimized by constraining users with a bad channel condition.

To provide quality-of-service (QoS) control for a shared, high-speed, downlink packet access wireless channel, the invention uses a novel dynamic resource control framework integrated with modulation and coding (AMC) and hybrid automatic repeat request (H-ARQ) to support class-based applications.

The invention also uses a novel wireless scheduling process called delay-sensitive dynamic fair queuing (DS-DFQ) to meet delay requirements of multimedia applications as well as to maintain high network efficiency.

The invention can adapt to load fluctuations from different traffic classes and dynamically changing wireless channel conditions affected by user mobility, fading and shadowing.

More particularly, a method allocates resources of a wireless communications network to traffic transmitted to user equipment over a channel of the network. A packet of the traffic to be stored in a selected queue is received. A maximum delay of the selected queue is determined, along with a start time, a finish time, and a queuing order. The packet is inserted in the selected queue according to the start time, the finish time and the queuing order, and then a weight of the selected queue is updated. Then, a next packet to be dequeued from the selected queue is scheduled, and the next packet is transmitted to the user equipment over the channel.

DETAILED DESCRIPTION OF THE PREFERRED EMBODIMENT OF THE INVENTION

System Structure

Figure 1:
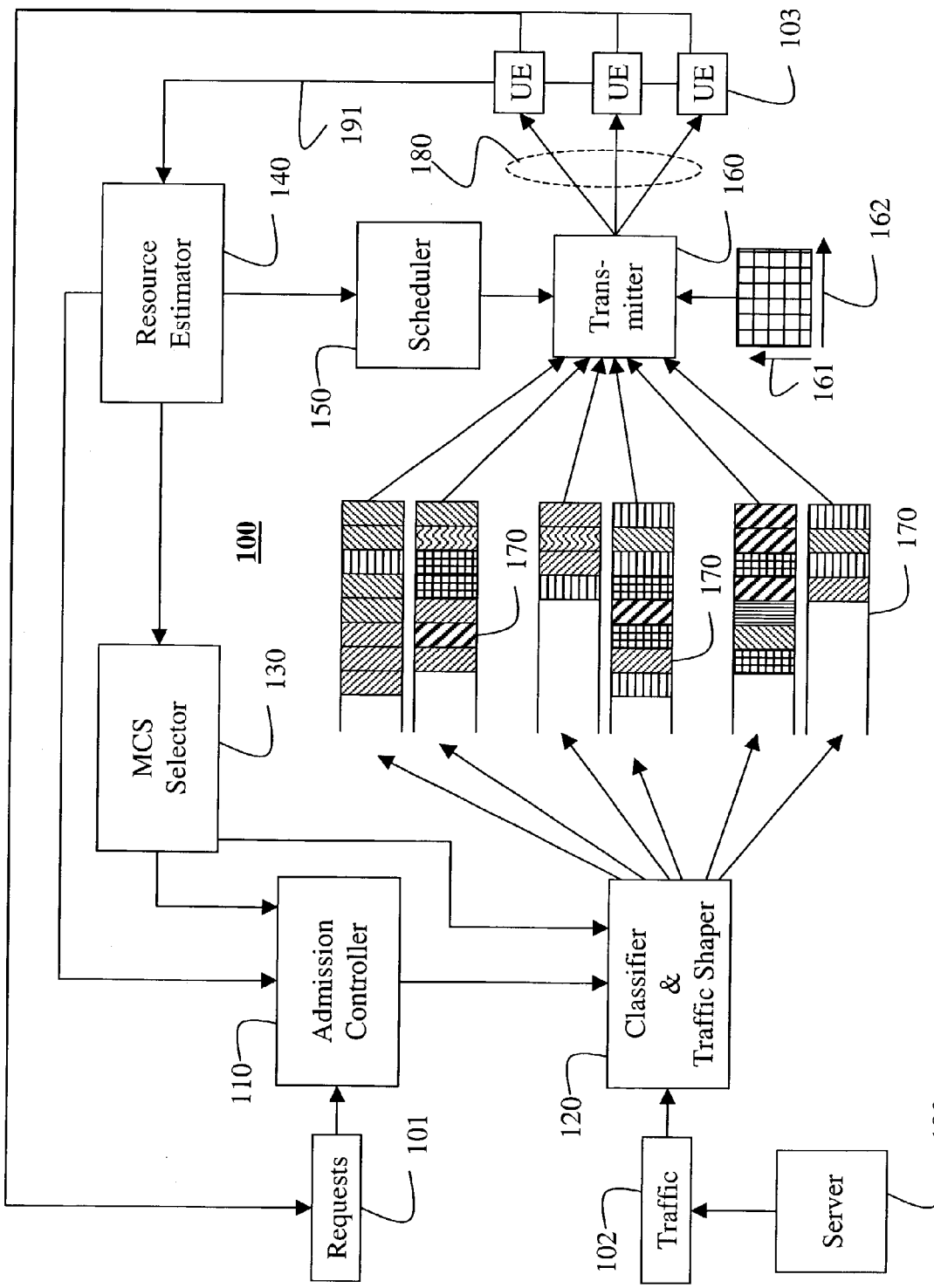
FIG. 1 is a block diagram of a system and method for controlling network resources according to the invention.

FIG. 1 shows a system and method 100 according to our invention. The system and method dynamically control resources in high-speed downlink packet access (HSDPA) channels of a wireless communications network, e.g., a cellular network. In such a network, a base station typically serves multiple instances of user equipment (UE) 103 in a cell via channels 180. The UE 103 can be static or mobile.

The system 100 includes an admission controller 110 coupled to a classifier and traffic shaper 120. A modulation and coding scheme (MCS) selector 130 provides input to the controller 110 and the classifier/shaper 120. A resource estimator 140 provides input to the controller 110 and the selector 130, and a scheduler 150. The scheduler is coupled to a transmitter 160. Output from the classifier/shaper 120 is stored in pairs of queues 170 before forwarded to the transmitter 160. The transmitter transmits data packet to the UE 103 over channels 180.

System Operation

During operation, the system 100 receives requests 101 for traffic 102 from the wireless user equipment (UE) 103 in the network, e.g., cellular telephones, mobile processors, and end-user terminals. The traffic is transmitted in the form of packets, as are well known in the art. The request 101 are passed to the admission controller 110. The traffic 102 can originate from a server 190 or other UE anywhere in the network.

If a request is admitted, depending on the output of the selector 130 and estimator 140, then the corresponding traffic 102 is classified and shaped 120, and the packets forwarded to the appropriate queues 170. The scheduler 150 determines the order in which the queued traffic is released to the transmitter 160, for transmission to the user equipment 103 over wireless channels 180, as described in greater detail below.

Dynamic Resource Control

It is an objective of our invention to achieve dynamic resource control for a base station including the admission controller 110, the classifier and traffic shaper 120, the MCS selector 130, the transmitter 160, the queues 170, the channels 180, and the user equipment 103. We assumed that there are multiple mobile or fixed UE 103 in each cell served by the base station, and that each UE can simultaneously support multiple different traffic classes.

The traffic classes can be conventional voice traffic, streaming audio and video traffic, interactive traffic such as browsing, and background best effort traffic such as e-mail. It should be understood that additional classes could be defined.

Compared with the prior art, our system and method not only considers how to schedule packets to different UE 103, but also schedules the different traffic classes in a multiple UE environments with possibly different channel conditions.

Therefore, the transmission requests 101 for traffic 102 are sent to the admission controller 110. The controller makes a decision whether to admit new transmission traffic into the network by estimating 140 the available resources from physical-layer resource measurements and existing traffic.

After a request has been admitted, the corresponding traffic stream is classified and shaped 120 before packets of the traffic is queued.

Traffic streams are classified 120 according to quality of service (QoS) parameters, e.g., delay and packet loss. The QoS parameters determine a length and a wireless fair queuing (WFQ) weight for each queue, and a weighted random early detection (RED).

If hybrid automatic repeat request (H-ARQ) are allowed, then the retransmission can introduce a large amount of additional traffic when conditions on the wireless channels 180 are in bad condition. Therefore, we assign two queues 170 to every class: an original transmission queue 170', and a retransmission queue 170".

For each class, sub-classes (different patterns) are specified according to the MCS selector 130 depending on channel conditions. Both spreading codes 161 and time frames 162 are scheduled and assigned to the traffic 102 for the UE 103. In 3GPP HSDPA, a time frame length, i.e., a transmission time interval (TTI) is constant and equal to 2 ms, and the spreading codes 101 are orthogonal codes. A spreading factor (SF) is fixed and equal to 16. We assume multiple spreading codes in the same TTI can be assigned to each UE 103. The WFQ weights are adjusted dynamically according to a status of each queue.

As shown in FIG. 1, the UE 103 monitors conditions of the channels 180 and feeds back carrier-to-interference (C/I) information 191. The channel condition 191 is used to estimate 140 the available resource and select 130 a modulation and coding scheme (MCS) for the traffic 102 for each UE 103.

If there are N MCS levels, then a data rate for MCS level n is $R_n (1 \leq n \leq N)$. A value FER ($\gamma$, n) denotes the frame error rate (FER) for a given signal-to-noise ratio of channel $\gamma$, and MCS level n.

Then, the effective data transmission rate is equal to $R_n \times (1 - FER (\gamma, n))$. A particular MCS level j is selected 130 so as to maximize the effective data rate for the measured condition of channel $\gamma$. That is, $$j = \max_n \{R_n \times (1 - FER(\gamma, n))\}.$$

A protocol data unit (PDU) at a wireless interface is the data traffic carried during a frame or TTI. Because data rate varies with the MCS level, the PDU size also varies. Therefore, the traffic is segmented according to the variable PDU size. The UE acknowledges the reception of a PDU. If an erroneous transmission of a PDU is detected, then the PDU is retransmitted at most M times.

During a retransmission, the MCS level remains the same as that for the original transmission. To improve link utilization and adapt to our scheduling procedure 150, we use a different maximum number of retransmission (M) for PDUs with different MCS levels. The higher MCS level, the larger the value of M.

Scheduling

We use a novel delay-sensitive dynamic fair queuing (DSDFQ) scheduling for HSDPA wireless multimedia traffic. The scheduler 150 is at the MAC layer for scheduling a PDUs in a frame or TTI with appropriate spreading codes 161. For convenience, we call the PDU a 'packet'.

We dynamically adjust the weight of each queue according to a current delay of the queue and schedule packets for transmission accordingly. We use different tokens to distinguish packets with different MCS levels within one class. In addition, we use the weighted RED to determine which packets are to be dropped. Our DSDFQ maintains a dynamic fairness according to the delay status of every queue. Unlike prior art fair queuing schemes, our queuing is not an approximate approach to generalized processor sharing (GPS).

A sorted priority queuing procedure, commonly used by virtual clock, WFQ and WF²Q processes is described by Zhang, in "Service Discipline For Guaranteed Performance Service in Packet-Switching Networks," Proceedings of IEEE, 83(10), October 1995. We adapt that technique for our DSDFQ.

In WFQ, a state variable F, the virtual finish time, is associated with each channel to monitor and enforce its traffic. In WFQ, the virtual finish time F of a packet is defined as:

$$F_i^k = \max\{F_i^{k-1}, V(t)\} + \frac{L_i^k}{\phi_i},$$

where $F_i^k$ is the virtual finish time of the $k^{th}$ packet of class i, V(t) is the virtual time when the kth packet is received, $\phi_i$ is the weight of class i, and $L_i^k$ is the packet size of the kth packet measured in bytes.

In the prior art WFQ, the weight $\phi_i$ is fixed and does not reflect the current channel condition. In contrast, for our DSDFQ, the weight of each queue $\phi_i$ is a variable. In response to a packet queuing event, a delay (delay) of a current packet is determined and used to change the weight $\phi_i$ according to:

$$\phi_i = f(\text{delay}_i^k) = \min(\phi_i^0 + \text{delay}_i^k \times k_i, \phi_i^{max}),$$

where $\phi_i^0$ is a basic weight of class i, $\phi_i^{max}$ is a maximum weight of class i, $\text{delay}_i^k$ is the queuing delay of the kth packet in class i, and $k_i$ is an adjustment parameter.

A value $S_i^k$ denotes a virtual time when serving a packet k in a class i starts, and $F_i^k$ denote the virtual time when serving of the packet k in class i finishes.

Enqueuing and Dequeuing Packets

Figure 2:
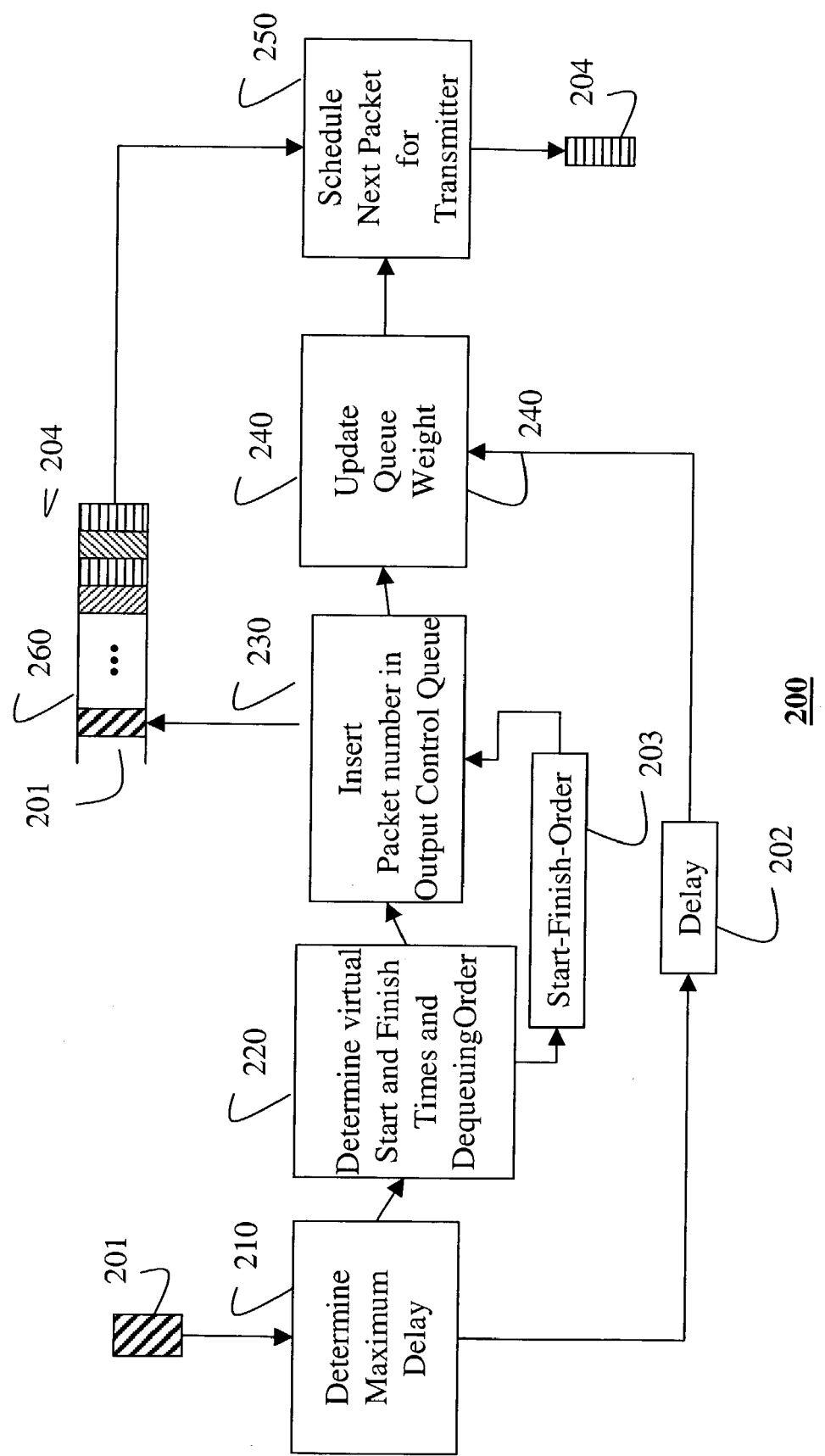
FIG. 2 is a block diagram of a queuing method according to the invention.

FIG. 2 shows a method 200 for enqueuing and dequeuing packets according to our invention that uses the variables and equations described above.

In response to receiving a new packet 201 of traffic to be queued, step 210 determines a maximum delay 202 for the corresponding queue 170.

Step 220 determines virtual start and virtual finish times Sk and Fi and a dequeuing order 203.

These two steps can be expressed by $$delay_i^k = delay_i^{k-1} + L_i^{k-1}/(\phi_i^{k-1} \times Bw) \times \sum_j \phi_j,$$

and $$F_i^k = \max\left(F_i^{k-1}, V(t_{last}) + (t - t_{last})/\sum_i \phi_i\right) + L_i^k/(\phi_i^k \times Bw),$$

respectively
where $L_i^{k-1}$ is the length of the kth packet in class i, Bw is a bandwidth of the channel, and $t_{last}$ is the real time that the virtual time last updated the weight for the queue.

Then, insert 230 the packet 201 number in the output control queue 260 according to an order of virtual finish time.

Step 240 updates the weight for the queue according to the new delay value, as follows:

$$\phi_i^k = f(delay_i^k) = \phi_i^0 + g(delay_i^k),$$

where, $\phi_i^0$ is the basic weight of class i, and g ($delay_i^k$) represents a weight curve.

Step 250 determines the real time t when the next packet 204 should be transmitted, and schedules the packet for dequeuing to the transmitter 160. The transmitter transmits the packet with right spreading codes 161 and time frames 162 according to the selected MCS 130.

If the real time for the next scheduled packet is Next(t), then at time Next(t), the weight and delay of each class are updated 240 as follows:

$$delay_i = delay_i - L_i^k/(\phi_i^k \times Bw) \times \sum_j \phi_j.$$

Thus, when a next packet $P_i^k$ is received, first determine 210 the delay, then increase the weight $\phi_i$ if the new delay is larger than the previous delay so a guaranteed bit-rate of class i is temporarily increased.

Because the packets of each class are received independently and the weight is updated each time a packet received, a dynamic balance is maintained, and the bandwidth is allocated more fairly than possible with prior art static scheduling methods.

Analysis

We analyze our DSDFQ process for the case when $g_i$(delay) is non-zero. We assume that the traffic has a constraint similar to that imposed by 'leaky bucket shaping'. If tokens from a 'leaky bucket' are used, then the traffic entering the network is shaped as follows:

$$A_i(\tau,t) \leq \sigma_i + \rho_i(t-\tau), \forall 0 \leq \tau \leq t,$$

where $A_i(\tau, t)$ is the amount of traffic for class i that enters the network during time interval $[\tau, t]$.

Tokens are generated at a fixed rate $\rho_i$, and packets are released into the network only after acquiring the required number of tokens from the leaky bucket. The leaky bucket contains at most $\sigma_i$ tokens.

In our scheme, the calculation of the delay 202 of the packet k 201 in class i is a key problem. As described above, we determine 210 the delay 202 when the packet 201 is received, and update 240 the weight whenever a packet 204 dequeues 250. Thus, the computed delay can be less than the real delay by a value within the range [1, L/Bw], where L is the packet length, and Bw is the bandwidth of the channel.

If the system 100 begins operation at a time zero, then $$D_i^k(t) = \sum_{(j,l) \subset A} L_j^l/Bw$$

is the total delay of packet k of class i from time zero. The real delay of packet k of class i can be represented by:

$$delay_i^k = D_i^k(t) - t = \sum_{(j,l) \subset A} L_j^l/Bw - t,$$

where t is the real time when packet k of class i is received.

Further, we assume that the scheduler 150 is 'greedy' so that the start time for the next packet coincides with the finish time of the previous packet. Thus, we have $$S_i^k = F_i^{k-1}, \text{ and}$$

$$F_i^k = S_i^k + L_i^k/(\phi_i^k \times Bw) = F_i^{k-1} + L_i^k/(\phi_i^k \times Bw).$$

From the above equation we obtain:

$$D_i^k = D_i^{k-1} + \sum_{(j,l) \subset B(i,k)} L_j^l/Bw$$

and $$B(i, k) = \{(j,l): F_j^l - F_i^{k-1} < L_i^k/(\phi_i^k \times Bw)\}.$$

The number of elements in the set B(i, k) can be interpreted as $N_B^{i,k}$, which satisfies $$N_B^{i,k} < \frac{L_i^k}{\phi_i^k \times Bw} \times \sum_{j \neq i}(\rho_j/L_{min} \times \phi_j^{max}) < \frac{L_{max}}{L_{min}} \times \sum_{j \neq i}(\rho_j \times \phi_j^{max}) \times \frac{1}{\phi_i^k}/Bw,$$

where $\rho_j$ is the average rate of class j, $L_{min}$ is the minimum size of a packet, and $\phi_j^{max}$ is the maximum weight of class j.

Now, we see that $$D_i^k < D_i^{k-1} + \frac{L_{max}}{Bw} \times \frac{L_{max}}{L_{min}} \times \sum_{j \neq i}(\rho_j \times \phi_j^{max}) \times \frac{1}{\phi_i^k}/Bw$$

$$D_i^k < D_i^{k-1} + \frac{1}{\phi_i^k} \times \frac{L_{max}^2}{Bw^2 \times L_{min}} \times \sum_{j \neq i}(\rho_j \times \phi_j^{max}) = D_i^{k-1} + Cs \times \frac{1}{\phi_i^k}.$$

Consequently, we can derive the delay as follows:

$$D_i^1 < Cs \times \frac{1}{\phi_i^0},$$

$$D_i^2 < D_i^1 + Cs \times \frac{1}{f(D_i^1)}, \text{ and}$$

$$D_i^k < D_i^{k-1} + Cs \times \frac{1}{f(D_i^{k-1})}.$$

The delay of packet k in class i is $delay_i^k = D_i^k - t_i^k$.

If the maximum size of a queue for class i is $qlim_i$, then a packet is dropped when the queue size $Qlen_i^k$ is equal to $qlim_i$, where $Qlen_i^k$ is restricted by:

$$Qlen_i^k = k - \sum_{l=1}^{k} (t_i^l - t_i^{l-1}) \times \frac{\phi_i^l}{\sum \phi_j} \times Bw \leq$$

$$k - \sum_{l=1}^{k} (t_i^l - t_i^{l-1}) \times \frac{\phi_i^l}{\sum \phi_j^{max}} \times Bw,$$

$$Qlen_i^k \leq k - \sum_{l=1}^{k} (t_i^l - t_i^{l-1}) \times \frac{f(delay_i^k)}{\sum \phi_j^{max}} \times Bw.$$

Effect of the Invention

Compared with the prior art WFQ and FIFO (no QoS) schemes, our DSDFQ method experiences less delay for both variable and constant bit-rate (CBR–VBR) streaming video. In the case of CBR, our method can control delay to 20 ms, whereas for WFQ the delay is almost twenty times longer than our scheme. In the case of VBR, our method reduces the delay by about one half. For other traffic classes, our method also attains better performance than both WFQ and FIFO.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for allocating resources of a wireless communications network to traffic to be transmitted from a wireless base station to wireless user equipment over a wireless downlink channel of the wireless communications network, the traffic including a plurality of packets, comprising:

receiving a request for the traffic in the wireless base station from the wireless user equipment;

estimating available resources from physical-layer resources of the wireless communications network and existing traffic on the wireless communications network, in which the estimating is based on feedback of a channel condition from the wireless user equipment;

admitting the request only if sufficient resources are available for transmitting the traffic and the existing traffic;

receiving a packet in a wireless base station to be stored in a selected queue of the wireless base station, in which there are a plurality of queues, and further comprising:

classifying the packet received in the wireless base station into one of i classes, there being one queue for each class, in which the packet is further classified into a sub-class according to one of a plurality of modulation and coding levels depending on the channel condition, in which there are N levels, and a data rate $R_n$ for level n is $R_n$ ($1 \leq n \leq N$), a frame error rate is FER ($\gamma$, n) for a signal-to-noise ratio of the channel $\gamma$ used to transmit the packet, and using level n so that an effective transmission rate is equal to $R_n \times (1-\text{FER}(\gamma, n))$;

selecting the $i^{th}$ queue as the selected queue;

determining a maximum delay of the selected queue;

determining a start time, a finish time, and a queuing order;

inserting the packet in the selected queue according to the start time, the finish time, and the queuing order;

updating a weight of the selected queue;

scheduling a next packet to be dequeued from the selected queue; and transmitting the next packet from the base station to the wireless user equipment over the wireless downlink channel of the wireless communications network.

2. The method of claim 1 wherein the plurality of classes include a conventional voice traffic class, a streaming audio and video traffic class, an interactive traffic class, and a best effort traffic class.

3. The method of claim 1 wherein each queue is associated with a retransmit queue, and further comprising:

selecting the retransmit queue if the packet is to be retransmitted.

4. The method of claim 1 wherein the traffic in the wireless communications network is classified according to quality of service parameters, and further comprising:

determining the weight for the selected queue based on the quality of service parameters; and determining a length of the selected queue based on the quality of service parameters.

5. The method of claim 3 wherein hybrid automatic repeat request (H-ARQ) are allowed.

* * * * *